(No Model.) 2 Sheets—Sheet 1.

C. TIMM.
BICYCLE CRANK.

No. 546,260. Patented Sept. 10, 1895.

Witnesses
Wm. F. Henning
Rob't C. Smith

Inventor
Charles Timm
by Chas. G. Page Atty

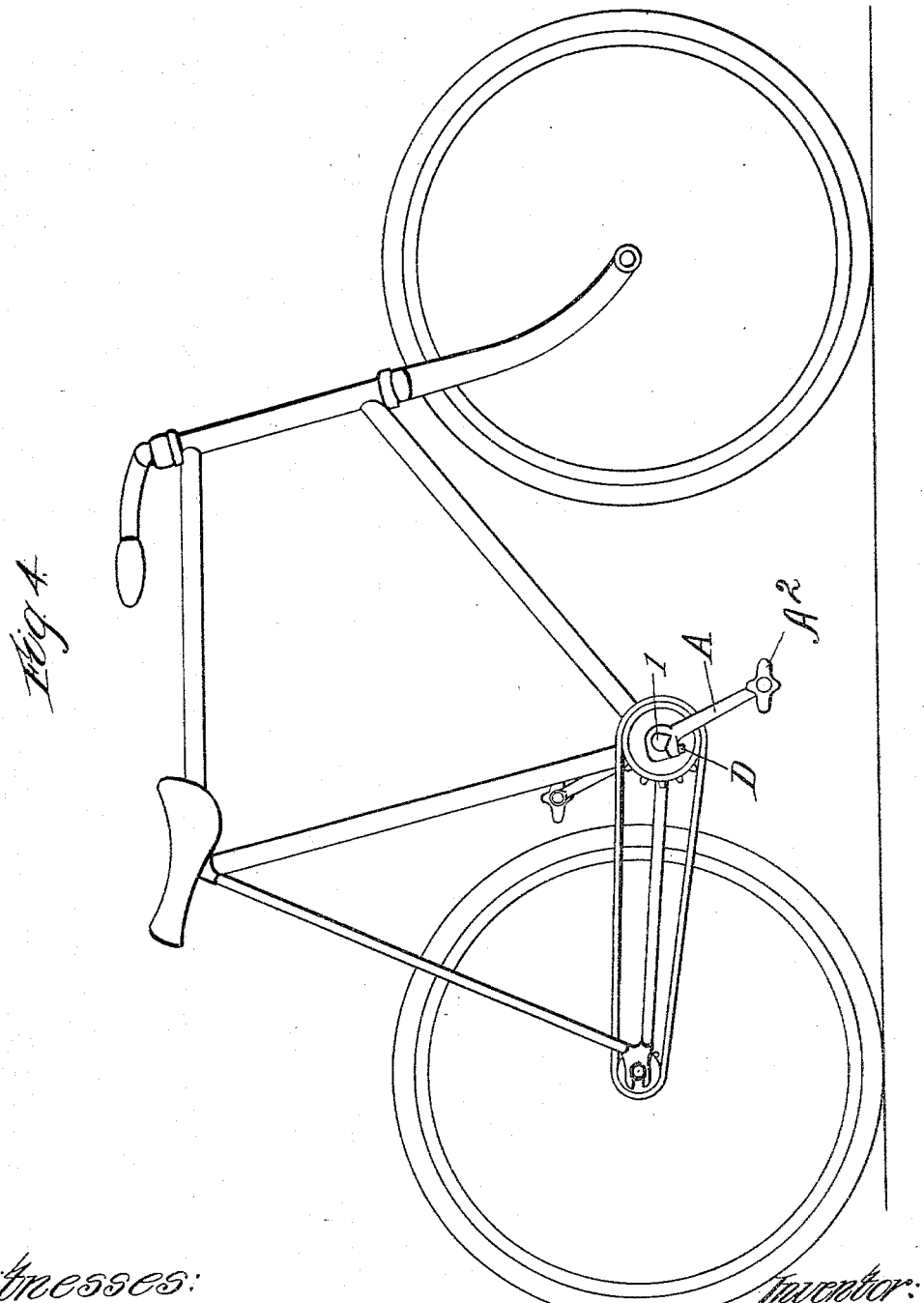

UNITED STATES PATENT OFFICE.

CHARLES TIMM, OF CHICAGO, ILLINOIS, ASSIGNOR TO THE STERLING CYCLE WORKS, OF SAME PLACE.

BICYCLE-CRANK.

SPECIFICATION forming part of Letters Patent No. 546,260, dated September 10, 1895.

Application filed June 6, 1894. Serial No. 513,718. (No model.)

*To all whom it may concern:*

Be it known that I, CHARLES TIMM, a citizen of the United States, residing at Chicago, in the county of Cook and State of Illinois, have invented a certain new and useful Improvement in Bicycle-Cranks, of which the following is a specification.

My invention relates to velocipede or bicycle cranks of the kind in which one end of the crank-arm is adapted for connection with the pedal and the opposite end thereof provided with an axle-collar having a transversely-split side and a screw-bolt for clamping such split collar upon the crank-axle.

The object of my invention is to provide an improved form of collar and arrangement of screw-bolt, whereby the several advantages hereinafter set forth are attained.

Figure 1:
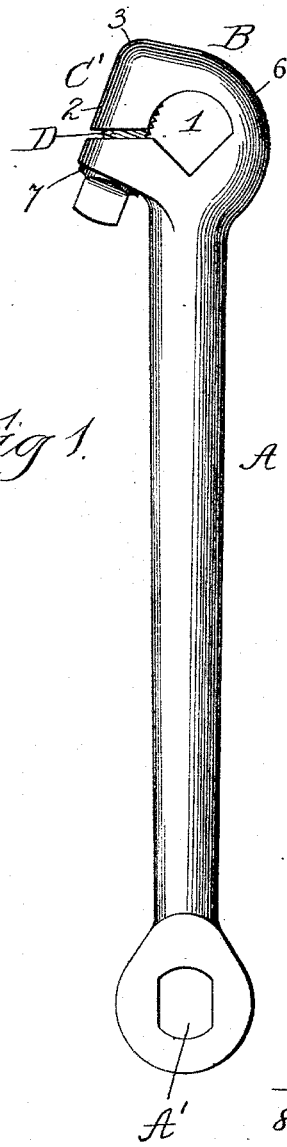
Figure 2:
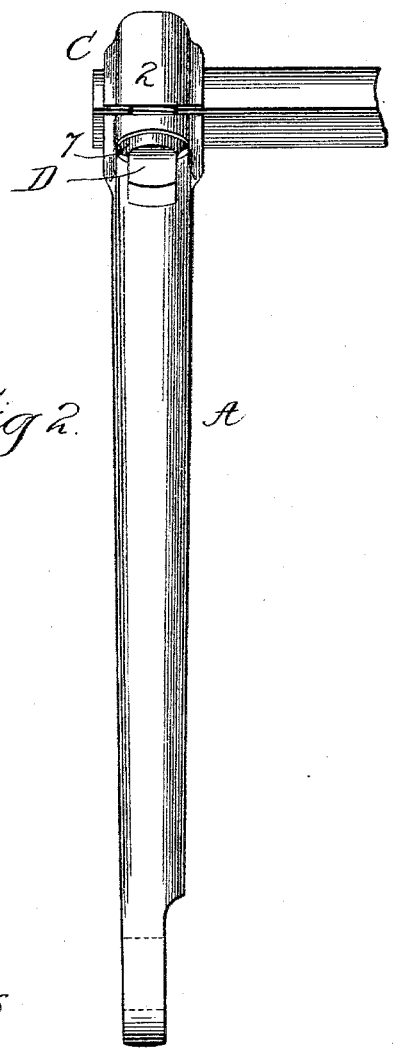
Figure 3:
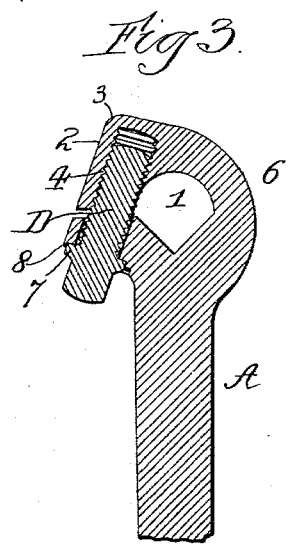

The crank-arm A is provided at one end with an eye A' for a bolt, by which the pedal A² is to be attached, as usual. The opposite end of the crank-arm is adapted to provide a split axle-collar B, having an opening 1, which is part circular and part angular, so as to dispense with the use of a key as a means for holding the crank against turning independently of the axle upon which it is fitted. The axle-collar is externally provided with an offset C, which projects from the straight portion of the crank-arm at an obtuse angle thereto. By this arrangement the offset will substantially face or lie opposite the pedal. The remaining peripheral portion of the axle-collar is formed so as to avoid an angle or projection liable to catch the trousers of the rider, and to such end it may have a flattened portion 2 extending from the outer end of the offset, a curved portion 6, and a rounded portion 3 between such curved and flattened portions. The transversely-split side C' of the collar comprises the straight or flattened portion 2, which latter is arranged at an angle to the plane of the oblique shoulder or offset, and is intersected by the transverse split, which divides the collar at one side. This divided side of the collar is provided with a bore or socket adapted to receive the screwbolt D and arranged substantially parallel with the straight side portion 2 of the collar, it being observed that the straight side 2 is oblique to a line taken longitudinally through the straight portion of the crank-arm. This socket is intersected by the split and has its outer end formed to open through the offset. The inner end of the socket terminates in the body of metal which forms the collar, and hence is closed. The inner end portion of the socket 4, which is formed at one side of the split, is threaded so as to be engaged by the screw, while the outer end portion of the socket, which is formed at the opposite side of the socket, is unthreaded and is of a greater diameter than the screw. The head of the screw is provided with a flange 7, which is countersunk in the offset, and for such purpose the outer end of the socket is enlarged, as at 8, so as to provide a bearing for the flange 7. By such arrangement the screw will turn easily, and its threaded portion will be protected from moisture and consequent rust, it being observed that when the collar is tightened upon an axle the socket will be closed and the only exposed portion of the screw will be the end or face of its head. The peculiar form of the collar avoids projecting jaws and an exposure of the screw and socket, and also dispenses with surplus metal and objectionable weight. The position of the corner formed at the outer end of the offset is such that during use the trousers of a rider will not come in contact with it, but in touching the collar, as sometimes happens, will fall upon and brush over the rounded portions 3 and 6. By arranging the offset at an obtuse angle to the straight portion of the crank-arm ready access can be had to the screw with a suitable tool and ample room for the hand of the user will be provided. The screw-bolt is arranged oblique to a line taken longitudinally through the straight portion of the crank-arm, and the (No Model.)
C. D. TISDALE.
AUTOMATIC ELECTRIC FIRE ALARM.
No. 546,261. Patented Sept. 10, 1895.
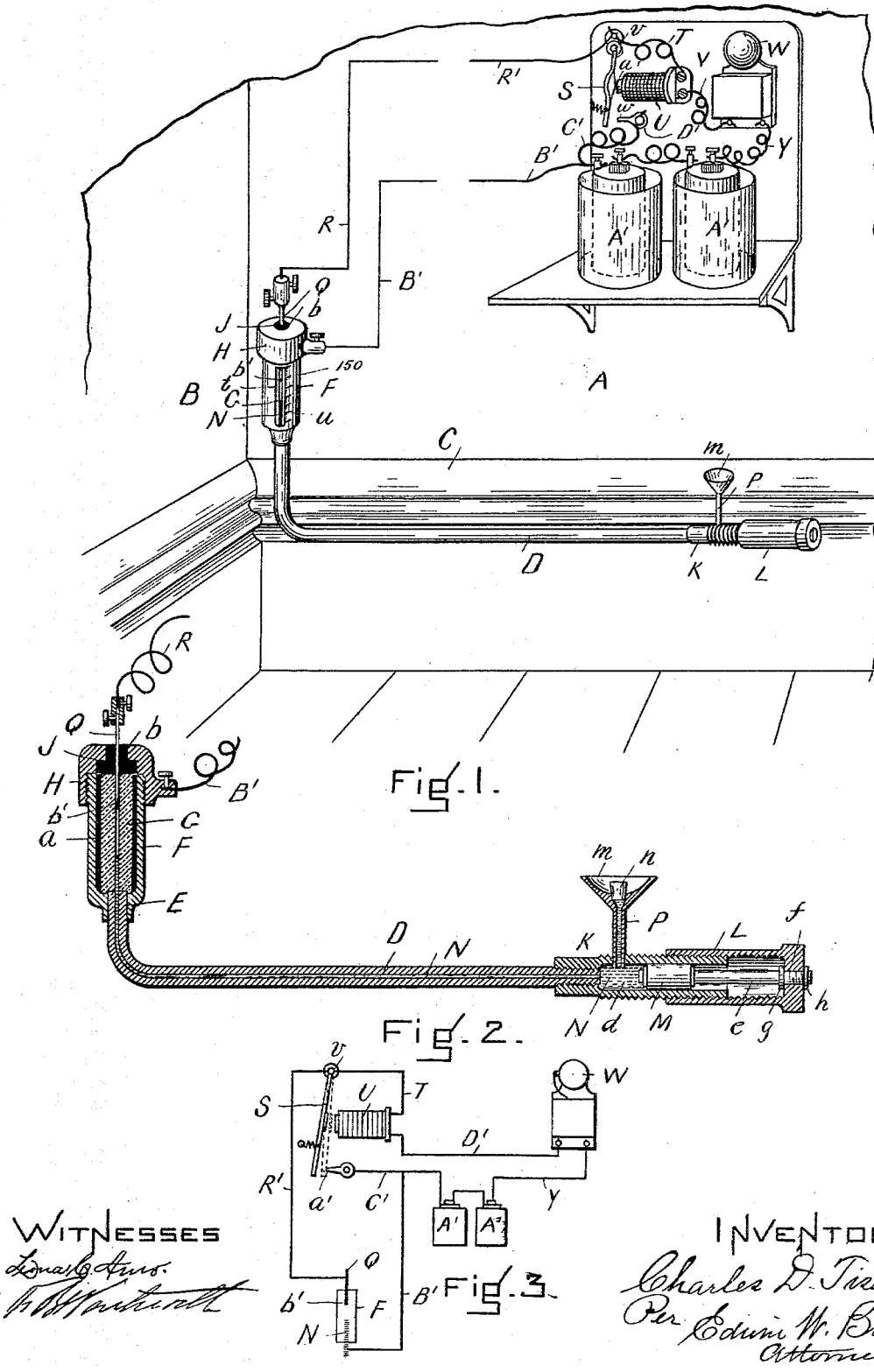

In the accompanying drawings, forming a part of this specification, and in which like letters and numerals of reference indicate corresponding parts, Figure 1 is a plan view of my improved crank. Fig. 2 is an edge view showing the crank in position on the axle. Fig. 3 is a sectional view of the upper portion of the crank, showing more particularly the manner of seating the binding-bolt within the crankhead collar. Fig. 4 represents in side elevation a bicycle provided with my improved crank.